UNITED STATES PATENT OFFICE.

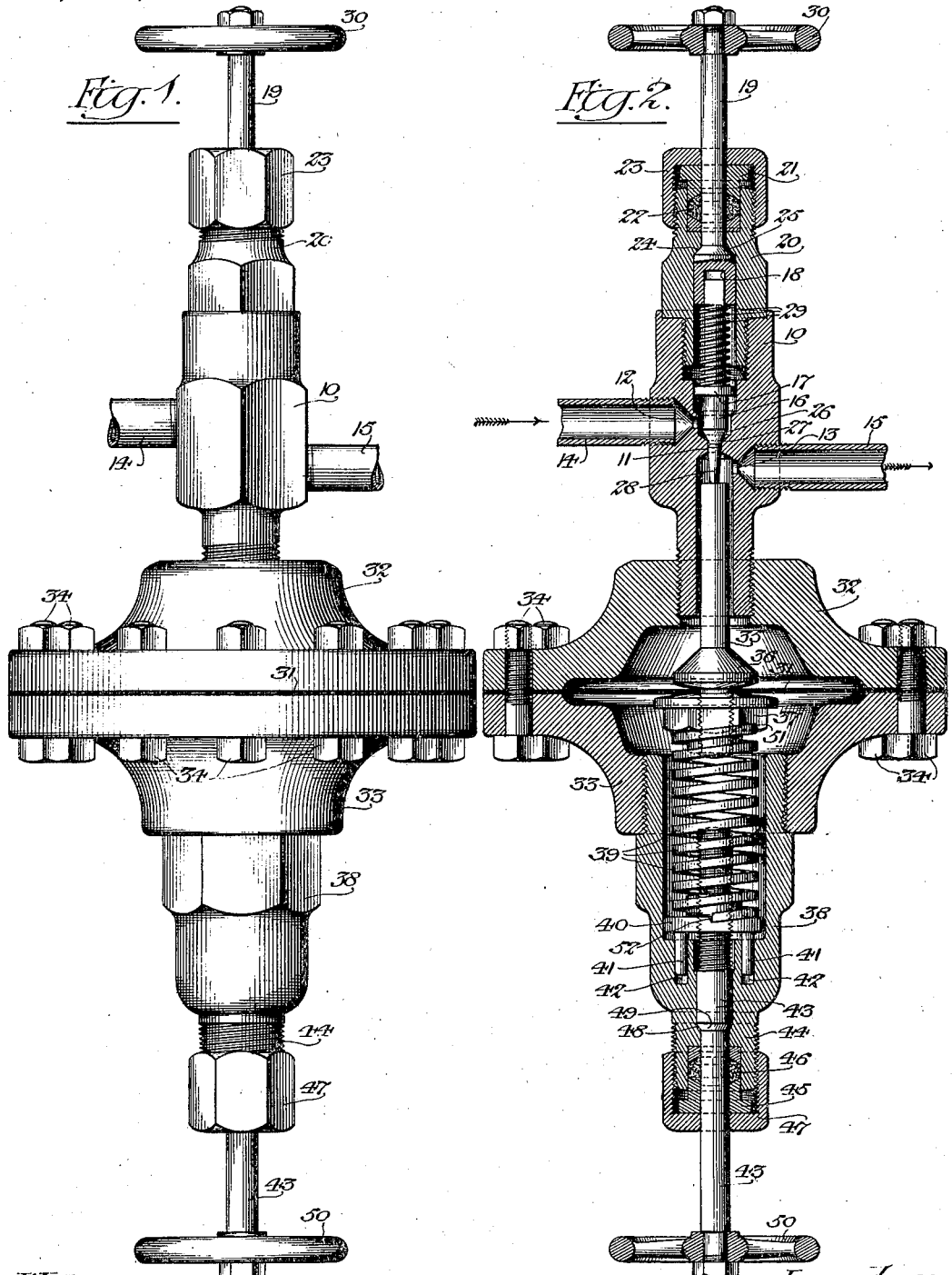

GEORGE CLARK, OF CHICAGO, ILLINOIS, ASSIGNOR TO WOLF, SAYER & HELLER, OF CHICAGO, ILLINOIS, A CORPORATION.

EXPANSION-VALVE.

1,218,745.  Specification of Letters Patent.  Patented Mar. 13, 1917.

Application filed May 25, 1911. Serial No. 629,409.

*To all whom it may concern:*

Be it known that I, GEORGE CLARK, a citizen of the United States, and a resident of Chicago, county of Cook, and State of Illinois, have invented certain new and useful Improvements in Expansion-Valves, of which the following is a full, clear, and exact description.

The invention relates to expansion valves employed for expanding liquid ammonia from comparatively high pressure to ammonia gas of relatively low pressure for refrigerating purposes, and seeks to provide a simple and effective form of valve in which the pressure controlled valve and its seat are provided with different portions for cutting off the supply fluid and for effecting the wire-drawing or attenuation of the ammoniacal fluid. Further objects of the invention are to improve the construction and arrangement of the valve and valve casing and of the diaphragm and spring connected thereto. The invention also seeks to provide means whereby the longitudinally shiftable, automatically controlled valve may be rotated to clean the valve seat.

The invention consists in the features of improvement hereinafter set forth, illustrated in the preferred form in the accompanying drawings and more particularly pointed out in the appended claims.

In the drawings, Figure 1 is a view in elevation of the improved valve and Fig. 2 is a longitudinal section thereof.

The valve casing proper comprises a short upright section 10 having a valve seat 11, an inlet port 12 in its side wall above the valve seat and a discharge port 13 below the valve seat and, in the form shown, diametrically opposite the inlet port 12. Inlet and discharge pipes 14 and 15 are threaded into the sides of the valve casing 10 and communicate respectively with the ports 12 and 13. The vertically or longitudinally shiftable valve 16 which controls the flow of the fluid through the valve casing, is arranged in the bore of the valve casing 10 on the inlet side of the valve seat. The valve, adjacent its lower end, is provided with an annular guide flange 17 which fits loosely within the bore of the valve casing. The upper end of the valve is rectangular in section and fits within a correspondingly shaped socket 18 in the enlarged lower end of a rotating stem 19. The stem 19 extends through a stuffing box 20, the reduced lower end of which is threaded into the upper portion of the bore of the valve casing 10. The stuffing box 20 is provided with the usual gland 21, packing 22 and adjusting nut 23. It is also provided with an annular conical seat 24 which is engaged by a conical valve-like shoulder 25 on the lower enlarged portion of the stem 19.

The valve 16 is provided at its lower end with an abrupt conical portion 26 and, when the valve is closed to cut off the flow of fluid, the shoulder or edge 27 at the upper end of the tapering opening through the valve seat makes a line contact with the abrupt conical portion 26 of the valve. Beyond the abrupt conical portion the valve is provided with an extension or needle 28 of slight taper which fits within and extends through the conical or tapering opening in the valve seat 11. The diameter of the valve is preferably reduced, as shown, between the abrupt conical portion 26 and the tapering extension or needle 28. When the valve is closed, the flow of fluid is cut off by the contacting annular shoulder 27 of the valve seat and the abrupt conical portion 26 of the valve. When the valve is partially opened and fluid is flowing through the opening of the valve seat, the wire-drawing or attenuation of the fluid is effected between the tapering walls of the valve seat opening and of the extension or needle 28. The closely adjacent parts of the valve seat which effect the wire-drawing or attenuation of the fluid are liable to be worn or cut away, particularly when the valve is used for expanding liquid ammonia, but by providing separate or different portions of the valve and valve seat for cutting off the flow of fluid and for effecting the attenuation thereof, the wear of these parts due to the wire-drawing will not prevent the valve from effectively seating to cut off the flow of fluid.

The flange 17 fits loosely within the bore of the casing 10, so that both its upper and lower surfaces are exposed to the inlet pressure. The diameter of the valve above this flange is somewhat reduced so that the pressure on its upper side is greater than that on its lower, and the inlet pressure thus tends to hold the valve in closed position. Preferably, also, a light spring 29 coiled about the valve stem extends between the flange 17 and the lower end of the rotating stem 19 and this spring also tends to move the valve to its closed position. The valve shifts longitudinally to open and close the port through the valve seat independently of the rotary stem 19 but, by rotating this stem, the valve will be rotated therewith to clean the valve seat. The escape of fluid from the upper portion of the valve casing is avoided by the stuffing box and particularly by the valve-like shoulder 25 on the stem and the coöperating seat 24 of the stuffing box. The upper end of the stem 19 is provided with a hand-wheel 30 by which it may be rotated.

The longitudinal movement of the valve 16 is effected by a diaphragm 31 arranged in a casing formed of upper and lower sections 32 and 33 bolted together, the upper section 32 being threaded, in the form shown, upon the lower end of the valve casing 10. The diaphragm 31 preferably comprises a number of thin steel sheets which are clamped between the edges of the casing sections 32 and 33 by the connecting bolts 34. The lower end of a stem 35 extends centrally through the diaphragm 31 and is provided above the diaphragm with an abutment 36 having a somewhat rounded lower face. A nut 37 having a somewhat rounded upper face is threaded on the lower end of the stem 35 to thereby clamp the stem securely to the diaphragm. The stem 35 extends upwardly through the lower portion of the bore of the valve casing 10 and engages the lower end of the extension or needle 28 of the valve 16.

A sleeve 38 is threaded at its upper end to the lower central portion of the casing section 33 and contains a heavy coiled spring 39, the upper end of which engages the nut 37. The lower end of the spring rests upon an adjusting collar 40 which fits within the bore of the sleeve 38 and is preferably provided with depending pins 41 engaging sockets 42 in the lower end portion of the sleeve 38. A stem or screw rod 43 extends through a stuffing box 44 on the lower end portion of the sleeve 38 and the inner end of this rod is threaded to engage the internally threaded bore of the adjusting collor 40. The stuffing box 44 is provided with the usual gland 45, packing 46 and adjusting nut 47. It is also provided with a beveled or inclined seat 48 which is engaged by a beveled or conical, valve-like shoulder 49 formed upon the stem or screw rod 43. The stuffing box and the engagement of the valve-like shoulder 49 with the seat 48 effectively prevent leaking around the screw rod so that an air cushion is maintained in the diaphragm casing below the diaphragm which prevents the sudden shifting of the valve 16 when the pressure varies. The outer end of the screw rod 43 is provided with a hand-wheel 50 by which the rod may be rotated to shift the collar 40 and adjust the pressure exerted by the spring 39 on the diaphragm 31, actuating rod 35 and valve 16. The spring 39 is adjusted in accordance with the desired amount of expansion of the liquid ammonia. The spring tends to open the valve 16 to permit the expansion of the liquid ammonia through the tapering opening of the valve seat 11. If the outlet pressure is too great, it will act upon the upper surface of the diaphragm 31 against the pressure of the spring 39, so that the valve is closed by the inlet pressure exerted upon the flange 17 and by the spring 29. If the outlet pressure falls below the desired amount, the spring 39 lifts the valve through the medium of the rod 35. The constant expansion and contraction of the spring 39 tend to wind and unwind the coils thereof and this movement would ordinarily tend to loosen the nut 37 and permit leaking of the ammonia through the diaphragm 31. In accordance with the present invention, this winding and unwinding movement of the spring and the loosening of the nut 37 is prevented by providing the nut 37 and the collar 40 with seats for the ends of the spring and shoulders 51 and 52 against which the extreme ends or tips of the spring abut.

It is obvious that numerous changes may be made in the details set forth without departure from the essentials of the invention as defined in the claims.

I claim as my invention:—

1. In an expansion valve, the combination of a valve casing having inlet and outlet ports, a valve seat between said ports and a valve coöperating with said seat, one of said parts having a conical surface and the other an angular shoulder arranged to make a line contact with said surface to cut off the flow of fluid, and said valve having a projecting needle extending through the opening of said valve seat to effect the attenuation or wiredrawing of the fluid, and pressure operated means acting on said projecting needle to actuate said valve, substantially as described.

2. In an expansion valve, the combination of a valve casing having inlet and outlet ports and an intermediate valve seat provided with a tapering opening therethrough, a valve coöperating with said seat to make a line contact therewith to cut off the flow of fluid, said valve having a projecting needle extending through the opening of the valve seat, pressure operated means acting on said projecting needle to actuate the valve, a spring for holding said valve in engagement with its seat and with said pressure actuating means, and a stem extending into said valve casing and engaging said valve to rotate the same independently of the pressure operated means, said valve having a sliding engagement with said stem whereby it may be shifted in longitudinal direction independently thereof by said pressure operated means, substantially as described.

3. In an expansion valve, the combination of a valve casing having inlet and outlet ports and an intermediate valve seat, a valve on the inlet side of said seat, pressure operated means on the outlet side of said seat for controlling said valve, said seat having a tapering opening therethrough and said valve having an abrupt conical face arranged to engage the upper edge of said seat opening to cut off the flow of fluid and a tapering extension fitting said opening and engaging said pressure operated means, substantially as described.

4. In an expansion valve, the combination with a valve casing having a valve seat and inlet and outlet ports in its side wall on opposite sides of said seat, a valve on the inlet side of said seat having a tapering extension projecting therethrough and coöperating with said seat to effect attenuation or wiredrawing of the fluid, a diaphragm casing on one end of said valve casing and communicating with the space on the outlet side of said valve seat, pressure-controlled means for shifting said valve longitudinally to and from its seat, an actuating rod associated with said means abutting against the extension of said valve to effect said longitudinal shifting of the valve, and means operable from a point without the casing to rotate the valve independently of the pressure-controlled means.

GEORGE CLARK.

Witnesses:
ELEANOR HAGENOW,
KATHARINE GERLACH.